United States Patent [19]
Movaghar et al.

[11] Patent Number: 5,998,786
[45] Date of Patent: *Dec. 7, 1999

[54] APPARATUS FOR SECURING CCD BOARD AT A FIXED POSITION WITHIN A RANGE OF MOTION

[75] Inventors: Abdolreza Movaghar; Josephine del Rosario; Mark Diel; David J. Schmeling, all of San Diego, Calif.

[73] Assignee: Hewlett-Packard Company, Palo Alto, Calif.

[ * ] Notice: This patent is subject to a terminal disclaimer.

[21] Appl. No.: 09/009,526

[22] Filed: Jan. 20, 1998

Related U.S. Application Data

[63] Continuation of application No. 08/701,619, Aug. 22, 1996, Pat. No. 5,736,738.

[51] Int. Cl.⁶ .............................. A47G 29/02; E04G 3/08; E06B 7/28
[52] U.S. Cl. ...................... 250/239; 250/234; 250/504 R
[58] Field of Search ........................... 250/216, 234–236, 250/239, 504 R; 524/533; 358/494

[56] References Cited

U.S. PATENT DOCUMENTS

| | | | |
|---|---|---|---|
| 5,367,399 | 11/1994 | Kramer | 250/236 |
| 5,391,009 | 2/1995 | Stodder | 400/605 |
| 5,463,212 | 10/1995 | Oshina et al. | 250/239 |
| 5,477,047 | 12/1995 | Nakagawa et al. | 250/239 |
| 5,736,738 | 4/1998 | Movaghar et al. | 250/239 |

Primary Examiner—Stephone Allen
Attorney, Agent, or Firm—Jerry R. Potts

[57] ABSTRACT

Apparatus for fixing the position of an optical sensor within a range of motion in relation to an optical apparatus. The fixing apparatus provides permits a range of motion through five degrees of freedom (DOF) during the securing process. The apparatus includes a housing for the optical assembly, a middle bracket, with the middle bracket secured to the optical apparatus. The range of motion is provided by a gimbal design in the housing and middle bracket which creates the five DOF. There are no screws involved in the fixing process to impart torques or forces to the parts being aligned and secured in position. An ultraviolet (UV) activated adhesive is used to secure the sensor housing to the middle bracket and the middle bracket to the optical scanner housing. The middle bracket is formed of a material transparent to UV light, and a high percentage of the UV light can pass through it to cure the adhesive applied between the parts. A vertical hole runs through tabs of both the housing and the middle bracket. The adhesive is applied into this region where it is constrained by the parts. The adhesive is a liquid during the alignment process which allows relative motion between the parts. When alignment is complete, the adhesive region is exposed to UV light which cures the adhesive into a solid vertical column, creating a form of chemical rivet. This chemical rivet provides a very strong mechanical interlock of the components in addition to the adhesive bonding of the components.

23 Claims, 6 Drawing Sheets

FIG. 10

APPARATUS FOR SECURING CCD BOARD AT A FIXED POSITION WITHIN A RANGE OF MOTION

CROSS-REFERENCE TO RELATED APPLICATION

This is a continuation of application Ser. No. 08/701,619, filed Aug. 22, 1996 now U.S. Pat. No. 5,736,738.

TECHNICAL FIELD OF THE INVENTION

This invention relates to the field of optical systems, and more particularly to optical systems employing optical sensors which require alignment for proper operation of the system.

BACKGROUND OF THE INVENTION

Optical systems such as optical scanner devices for scanning a recorded image to produce a representative image use optical sensor arrays such as charged coupled device (CCD) arrays. The CCD array is situated relative to the recorded image such that the recorded image and CCD array move relative to each other, wherein the recorded image moves in relation to the optical sensor array. The sensor array converts the image into electrical signals representative of image pixels comprising the image. Typical of these optical scanner devices are multiple function machines which include the functions of a printer, facsimile machine, photocopy machine and/or optical scanner device within one machine.

In order to achieve optimal scanning quality, the optical sensor and the optical system need to be aligned, positioned and fixed in space relative to each other. For a single line CCD, five degrees of freedom (DOF) out of six DOF are essential to this alignment. The majority of scanners on the market today have active control of only four DOF; movement along the x and z axis and rotation about the y axis are controlled on the CCD device, and movement along the y axis is controlled on the lens. Consequently these scanners have very small tolerances in the rotational z direction. The typical securing method is to tighten down two screws which hold the CCD relative to the optical path. This tightening process imparts torques and forces to the CCD which move it from the optimum aligned position. Also, moving the lens in the y direction degrades the optimum alignment because (i) the optical axis is typically not parallel to the axis of movement, and (ii) mechanical imperfections in the lens and/or housing cause undesired movement in the other axes during movement in the y direction.

It would therefore be an improvement in the art to provide an optical sensor system with improved alignment capabilities, wherein the optical sensor can be aligned without causing forces moving the sensor from the optimum aligned position.

SUMMARY OF THE INVENTION

In accordance with an aspect of the invention, apparatus is described for securing an optical apparatus at a fixed relative location within a range of motion. The apparatus includes a first housing member holding the optical apparatus, and a first bracket member fabricated of a UV transparent material. The apparatus further includes a compliant apparatus for holding the first housing member and the first bracket member loosely together, while permitting relative motion between the first housing and the first bracket member through a range of motion. A curable bonding element applied between areas of the first housing member and the first bracket member bonds the first housing member and the first bracket member together in a fixed position within the range of movement. The bonding element is applied while in a liquid state to permit the relative motion, and includes an adhesive which is cured to a solid state by exposure to ultraviolet light. The first housing member and the first bracket member are fixed in the relative position by the curing of the adhesive to a solid state.

A preferred application for the invention is in an optical scanner device, wherein the optical sensor array is moveable through a range of motion relative to a scanner housing, and then fixed in a desired location within the range of motion by use of the curable element.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
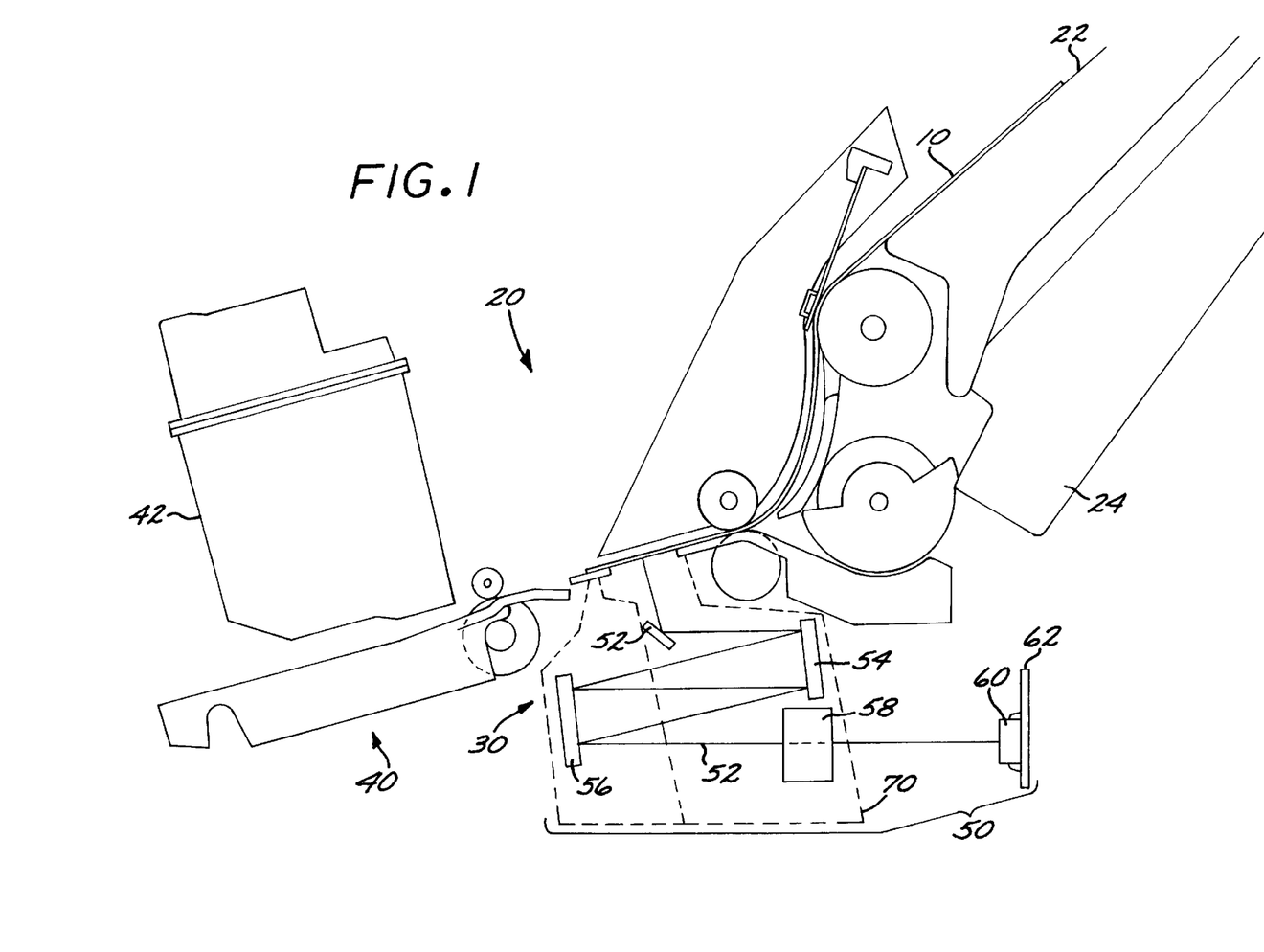
FIG. 1 is a simplified side view of a multiple function machine employing the invention.

FIG. 1 is a simplified side view of an exemplary apparatus employing this invention. This apparatus is a multiple-function device 20 of the type described in commonly assigned U.S. Pat. No. 5,391,009, the entire contents of which are incorporated herein by this reference. The device 20 performs functions such as optically scanning imagery from a printed sheet 10 fed through a feed path from an automatic document feeder 22 to a scanner station 30, or printing imagery onto a sheet fed from a sheet feeder 24 and fed through a feed path to a printing station 40, wherein printing is performed via ink-jet cartridge 42, mounted on a traversing carriage (not shown) for movement transverse to the feed path. This invention is concerned with the optical scanner apparatus comprising the device 20.

The scanning station 30 includes a scanner assembly 50 which includes a light source for illuminating the surface of the document 10 to be optically scanned, the light reflected from the document surface through a light path indicated by line 52 which is folded by mirrors 52, 54 and 56 and directed through a lens 58 for focusing onto a linear optical sensor array 60, attached to a printed circuit assembly board 62. In this exemplary embodiment, the sensor array 60 comprises a linear charge coupled device (CCD) array. As is known in the optical scanner art, the document 10 is sequentially advanced through the scanner station in incremental steps, with the array 60 capturing thin lines or areas of the document surface in electrical signal form, e.g as a line of pixels having pixel values. The device includes a processor (not shown) for assembling the successive lines of pixels into an image of the scanned document surface.

To optimize the scanning performance of the optical scanner station 30, the sensor array 60 is typically optically aligned with respect to the image projected through the lens 58, and then secured in place. This invention concerns a technique by which the sensor array is fixed in position within a range of movement.

The optical apparatus in accordance with this invention provides active control over five DOF during the securing process. All five DOF (x, y, z, and rotational z and y) are controlled on the CCD array 60 without any movement of the lens 58. The lens can be secured prior to alignment and fixing in position of the CCD array, and is preferably not moved during the CCD array alignment and subsequent securing process. Securing of the CCD array is done through a gimbal design in a CCD housing and middle bracket which creates the five DOF required. There are no screws involved in the securing process to impart torques or forces to the parts. An ultraviolet (UV) activated adhesive is used to secure the CCD housing to the middle bracket and the middle bracket to the optical scanner housing. The middle bracket is clear, and a high percentage of the UV light can pass through it to cure the adhesive applied between the two parts. A vertical hole runs through tabs of both the CCD housing and the middle bracket. The adhesive is applied into this region where it is constrained by the parts. The adhesive is a liquid during the alignment process which allows relative motion between the parts. When the parts have been moved to the proper position within the range of motion, the adhesive region is exposed to UV light which cures the adhesive into a solid vertical column, creating a form of chemical rivet. This chemical rivet provides a very strong mechanical interlock of the components in addition to the adhesive bonding of the components.

Figure 2:
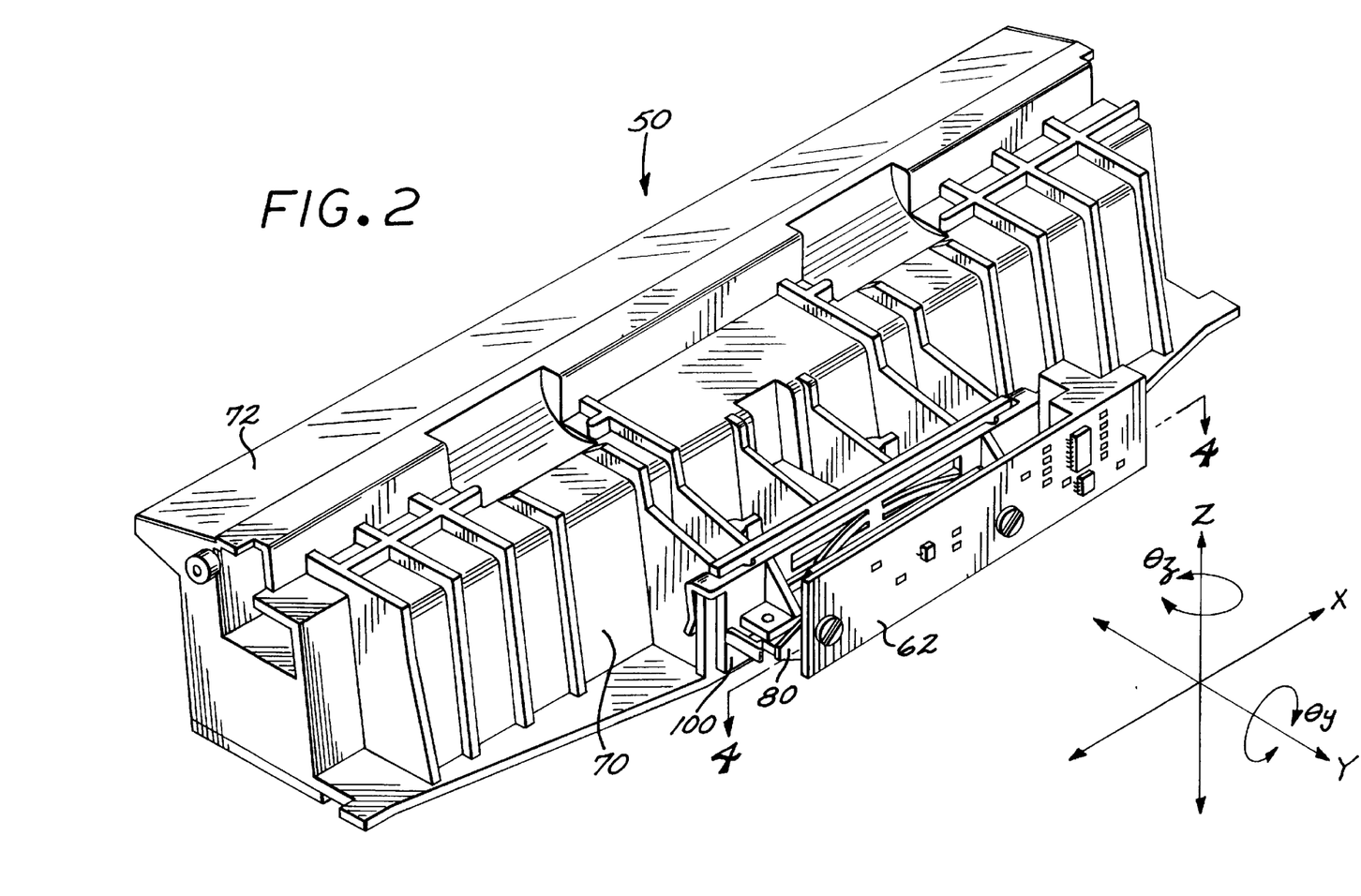
FIG. 2 is an isometric view of an optical scanner apparatus embodying the invention.

FIG. 2 is an isometric view of the scanner assembly 50, which includes a housing 70 fabricated of a molded opaque rigid plastic material, with a transparent window installed at the scanner zone through with the document to be scanned is passed. A linear light source such as a row of LEDs (not shown) is placed below the window inside the housing. The CCD array 60 (not visible in FIG. 2) is installed on the CCD printed circuit assembly board 62.

Figure 3:
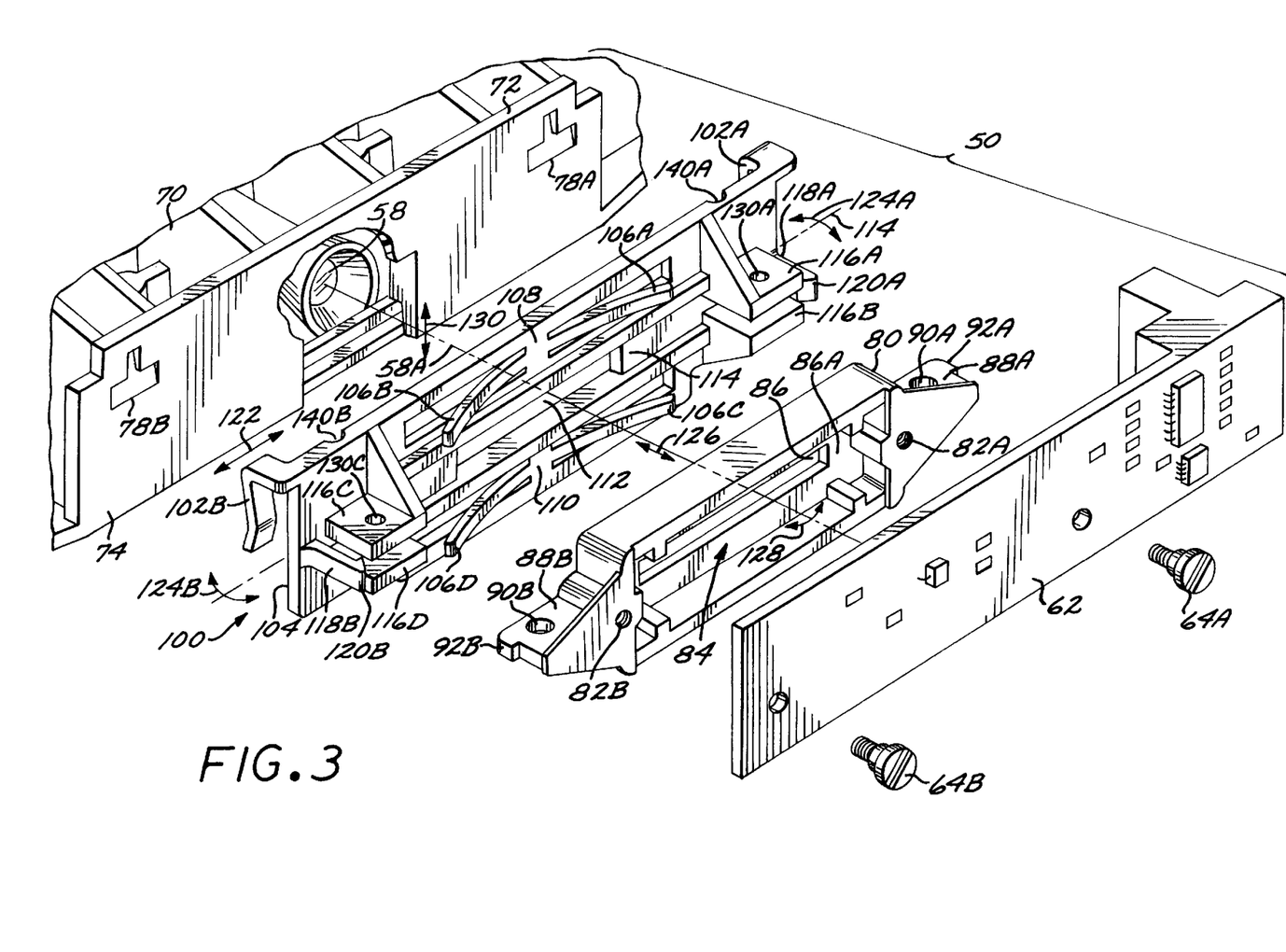
FIG. 3 is an exploded view of the scanner housing, middle bracket, optical sensor housing and optical sensor board of the apparatus of FIG. 2.

FIG. 3 is an exploded view of elements securing the CCD printed circuit assembly board 62 to the scanner housing 70. The CCD array 60 (not visible in FIG. 3) is secured to the board 62 by a conventional connector, not visible in FIG. 3, and thus is fixed in position relative to the board 62. Electrical signals from the CCD array are carried from the board 62 to the device processor via a ribbon cable, also not shown.

The CCD printed assembly board 62 is secured to a CCD housing 80 by threaded fasteners 64A and 64B which are received in bores 82A and 82B. In this exemplary embodiment, the CCD housing is fabricated of an opaque rigid plastic material, e.g. a polycarbonate modified with 20% glass fibers, and is formed to define a generally rectilinear interior enclosed area 84 which receives the CCD array 60 and forms an opaque structure around the structure 60. The housing 80 has a window opening 86 formed in wall 86A through which image light passes from the lens 58 to the CCD array 60. Thus, the position of the CCD array 60 is rigidly fixed in relation to the CCD housing 80. The housing 80 further includes protruding tabs which extend generally along a center axis of the elongated housing 80, and have formed therein openings 90A and 90B which receive UV-cured adhesive, as will be described in further detail. The tabs further have protruding ears 92A and 92B.

The scanner assembly 50 further includes a middle bracket 100 which is fabricated of a material which is substantially transparent to UV light. An exemplary material suitable for the purpose is a clear plastic material such as polycarbonate. One exemplary commercially available polycarbonate is LEXAN (TM), 3412-739, marketed by General Electric Company. The bracket 100 includes several features, including attachment clip elements 102A and 102B for loosely affixing the bracket 100 to the scanner housing 70. The scanner housing 70 includes a flat wall 72 which defines a generally planar surface 74 against which a corresponding generally planar surface 104 abuts. The wall has an opening 76 (FIG. 4) formed therein as a window to permit image light to pass from the lens 58 therethrough. The upper corners of the wall 72 are notched away to provide respective areas which receive the clip elements 102A and 102B, respectively. The material from which the middle bracket 100 is formed is a resilient material, so that the clips are biased away from a rest position when the clips are positioned in place relative to the wall 72, in the manner illustrated in FIG. 2. The position of the middle bracket 100 relative to the wall 70 can be slidably changed within in a range of movement in a plane essentially transverse to the optical axis 58A of the lens 58, until the adhesive is applied and cured. This movement is along the X and Y axes, and is represented by arrows 122 and 130 (FIG. 3). Moreover, the clips 102A and 102B permit rotational (skew) movement about the Y axis, as represented by arrows 124A and 124B.

The middle bracket 100 further includes a window 112 defined through the wall 114 which aligns with the window 86 formed in the CCD housing to permit image light to pass therethrough from the lens to the window 86.

The middle bracket 100 further includes a compliance apparatus for holding the middle bracket and the CCD housing member 80 loosely together while permitting relative motion between these two elements within a range of motion. The compliance apparatus includes four flexible, curved fingers 106A–106D which are integrally formed with the bracket. The fingers 106A–106B have respective ends integrally attached to a post section 108 defined in the wall 104 and which extends generally transversely to the elongate axis 114 of the middle bracket. Similarly the fingers 106C and 106D have respective ends integrally attached to a post section 110 defined in the wall 104 and extending generally transversely to the elongate axis 114. The tip of each finger curves inwardly away from the wall 104. The finger tips each contact the outward surface of the wall 86A of the CCD housing when the housing and bracket 100 are brought together. Since the fingers are formed in the curved position illustrated in FIG. 3, yet are flexible and tend to spring back to this position, the flexible fingers provide a gimbals with spring biasing toward a rest position.

The compliance apparatus of the middle bracket further includes pairs of spaced, aligned tabs 116A–116B and 116C–116D which extend transversely from the wall 104. The spacing between the tabs of each pair is sufficient allow the tabs 88A and 88B of the CCD housing 80 to slide therebetween when the housing 80 and bracket are assembled together, e.g. as shown in FIG. 2. To lock the bracket 100 and housing 80 in a loosely assembled configuration, the bracket 100 further includes lugs 118A and 118B extending outboard of the tabs 116A–116D, with barb ends 120A, 120B sliding over the respective ears 92A and 92B of the housing 80. While the lugs 118A and 118B lock the elements 80 and 100 together in the loosely assembled configuration, relative movement between the elements 80 and 100 through a range of movement is not constrained by the locking action of the lugs. The range of movement includes rotational movement about the Z axis (FIG. 2) to provide a differential focus adjustment, as represented by arrow 128 (FIG. 3), and translational movement along the Y axis to provide a focus adjustment, as represented by arrow 128.

Figure 7:
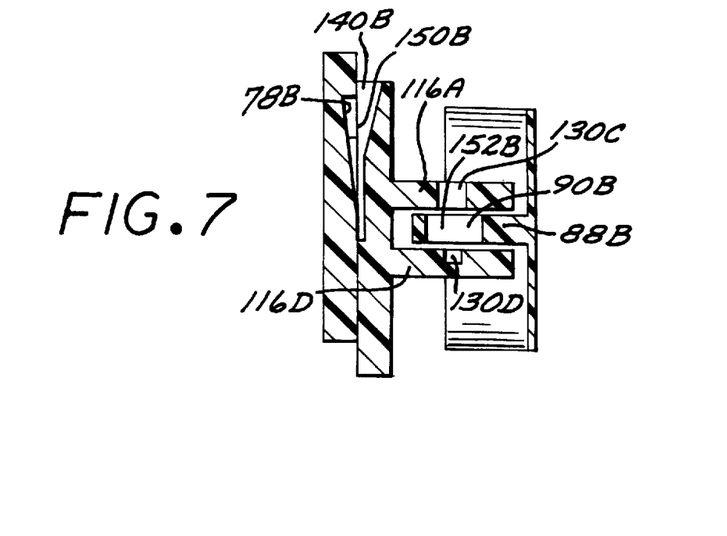
FIG. 7 is a cross-sectional view taken along line 7—7 of FIG. 4.

The pairs of tabs 116A–116B and 116C–116D have formed therethrough aligned hole pairs 130A–30B and 130C–130D, which receive liquid adhesive, as will be described in further detail. It is to be noted that the diameter of the holes 130A–130D is smaller than the diameter of the holes 90A–90B formed in the CCD housing 80. The holes 130A and 130C are through holes, extending through the respective tabs 116A and 116C. The holes 130B and 130D extend only partially into the respective tabs 116B and 116D, as shown in FIG. 7 (hole 116D). This is to prevent the liquid adhesive material from leaking out of the cavities defined by the holes and corresponding holes formed in the tabs 88A and 88B; one such cavity 152B is shown in FIG. 7.

Figure 4:
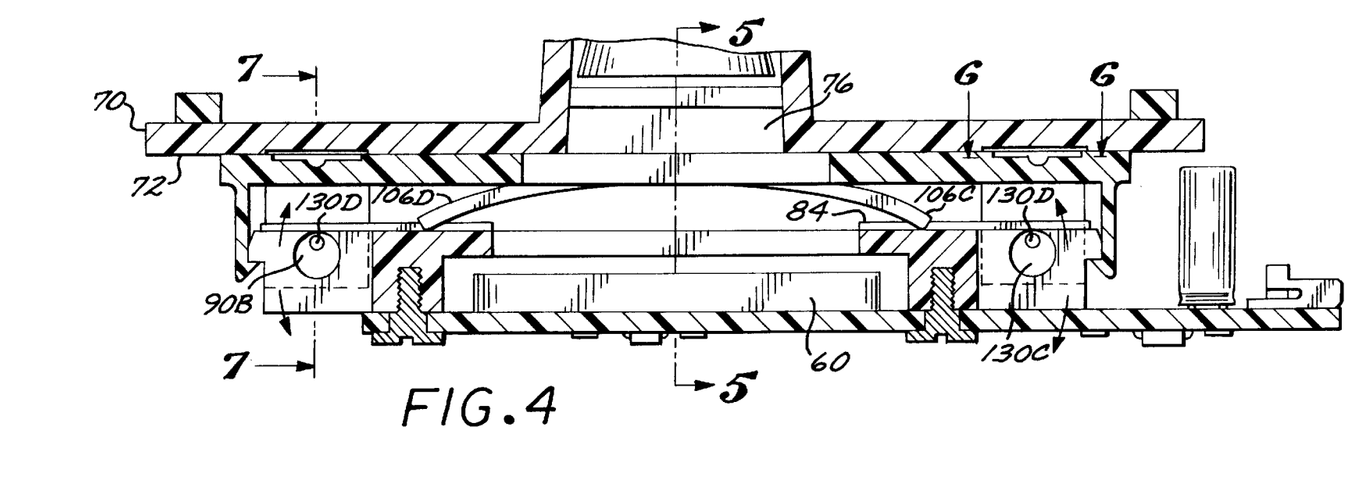
FIG. 4 is a cross-sectional view taken along line 4—4 of FIG. 2.

FIG. 4 is a cross-sectional view of the scanner assembly 50, taken through line 4—4 of FIG. 2. In this view, the adhesive has not yet been applied, and so the CCD board 100 and middle bracket 100 are in the assembled, rest position to which these parts have been biased by the compliance apparatus. Shown in this view is the contact made by the spring fingers 106, and the capturing by the barbed ends 120A, 120B (of lugs 118A, 118B) of the ears 92A, 92B of the CCD board 80.

Figure 5:
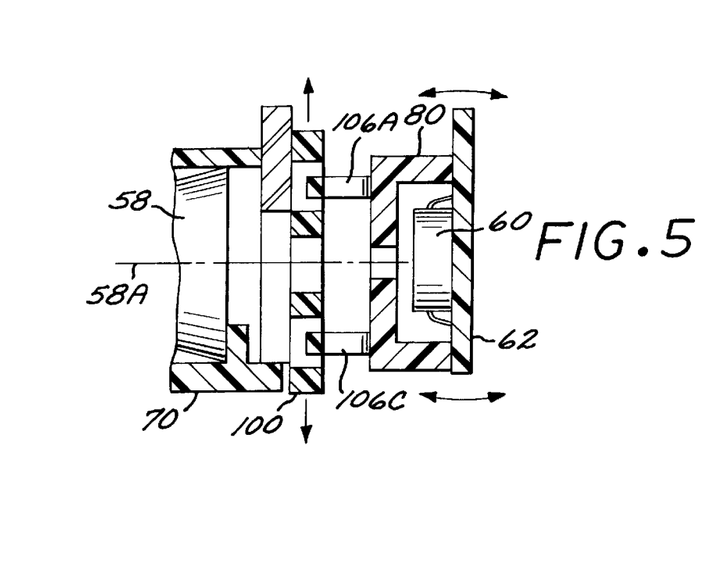
FIG. 5 is a cross-sectional view taken along line 5—5 of FIG. 4.

FIG. 5 is a cross-sectional view taken through line 5—5 of FIG. 4, illustrating in further detail the assembled arrangement of the housing 70, CCD housing 80 and the middle bracket 100.

Figure 6:
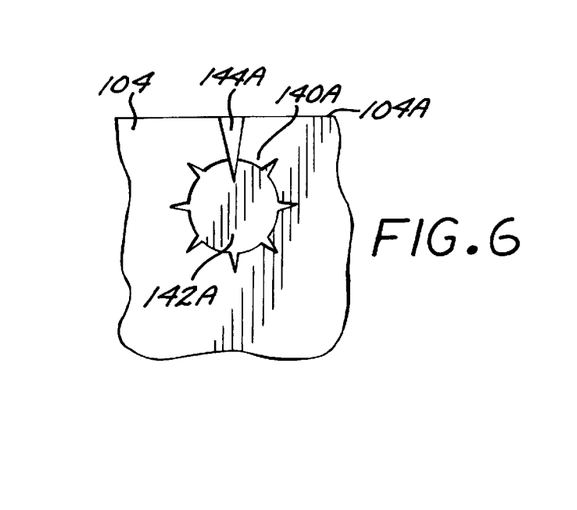
FIG. 6 is a cross-sectional view taken along line 6—6 of FIG. 4.

FIG. 6 is a close-up, enlarged view of a portion of the surface of wall 104 of the middle bracket 100 facing the scanner housing 70, and illustrating one of the adhesive-receiving features 104A, 104B formed in the wall 104. The feature 140A includes a depression 142A defined in the wall, of generally circular form, with a tapered notch 144A leading from the top edge 104A of the wall into the depression 142A. Several smaller notches 146A are defined in the edge of the depression and extend radially outwardly. The features 104A, 104B are identical.

When the bracket 100 is affixed to the scanner housing 70 by the clips 102A, 102B, the features 104A, 104B are adjacent adhesive-receiving features 78A, 78B formed in the wall 74 of the scanner housing 70. The features 78A, 78B are, in this exemplary embodiment, T-shaped depressions formed in the wall 74. With the middle bracket 100 clipped against the wall 74, the corresponding features 78A, 140A and 78B, 140B form cavities with an open channel defined by the notches 144A, 144B leading from the top edge 104A into the cavities. Adhesive in a liquid state can be dispensed into these cavities through the channels. The interior surfaces of the cavities can be roughened to provide improved surface adhesion.

FIG. 7 is a cross-sectional view taken through line 77 of FIG. 4, and illustrates one cavity 150B defined by the features 140B and 78B. The two cavities 150A and 150B, which the application and curing of an adhesive, provide a means of fixed rigidly in relative position the scanner housing 70 and the middle bracket 100.

Two other adhesive-receiving cavities are employed in the scanner assembly 50 in accordance with the invention, in order to rigidly fix the relative positions of the middle bracket 100 and the CCD housing 80. These two cavities 152A and 152B, (cavity 152B is shown in FIG. 7), with application and curing of adhesive in the cavities, provide the means of rigidly fixing the relative positions of the elements 80 and 100 at one position within the range of movement permitted by the compliance apparatus. The adhesive can be dispensed in its liquid state into the cavities 152A, 152B with the assembly in an upright position as shown in FIG. 7.

FIG. 7 shows one cavity 152B, defined by the holes 130C, 130D formed in the tabs 116C, 116D of the bracket 100, and the larger hole 90B formed in the tab 88B of the housing 80. Because the diameter of the intermediate hole 90B is larger than the diameters of the upper and lower holes 130C, 130D, the cavity 152B correspondingly has a larger diameter middle cavity portion sandwiched between smaller diameter upper and lower cavity portions. As a result, the adhesive when dispensed into the cavity 152B and cured will form a solid "rivet" or column of adhesive material that is locked in place by the surrounding edges of the tabs 88B, 116C and 116D. Since the hole 130D is not a through hole through tab 116D, the liquid adhesive will not run out the bottom of the cavity 152B.

Figure 8:
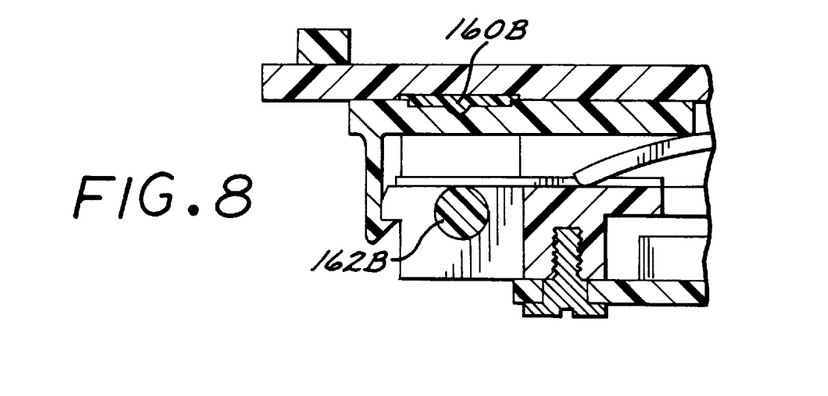
FIG. 8 illustrates a portion of the assembly of FIG. 4 at the left end thereof after applying and curing of the adhesive.
Figure 9:
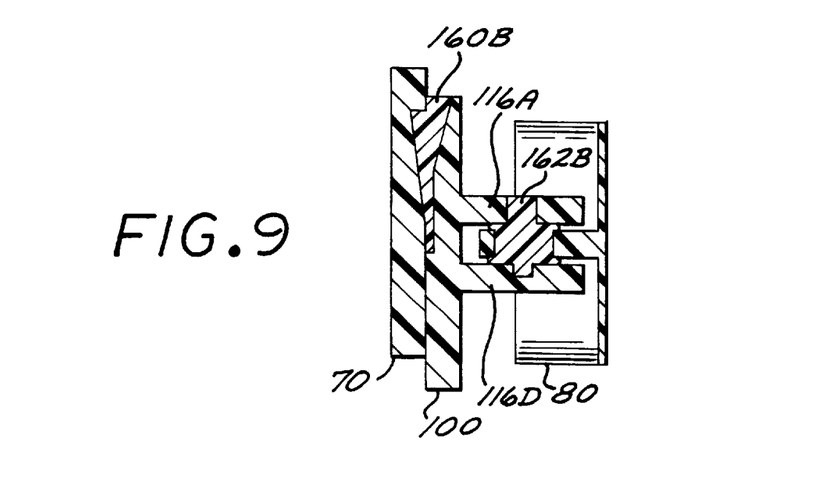
FIG. 9 is a cross-sectional view similar to FIG. 7, but illustrating the adhesive filling the adhesive cavities adjacent the left end of the assembly of FIG. 4.
Figure 10:
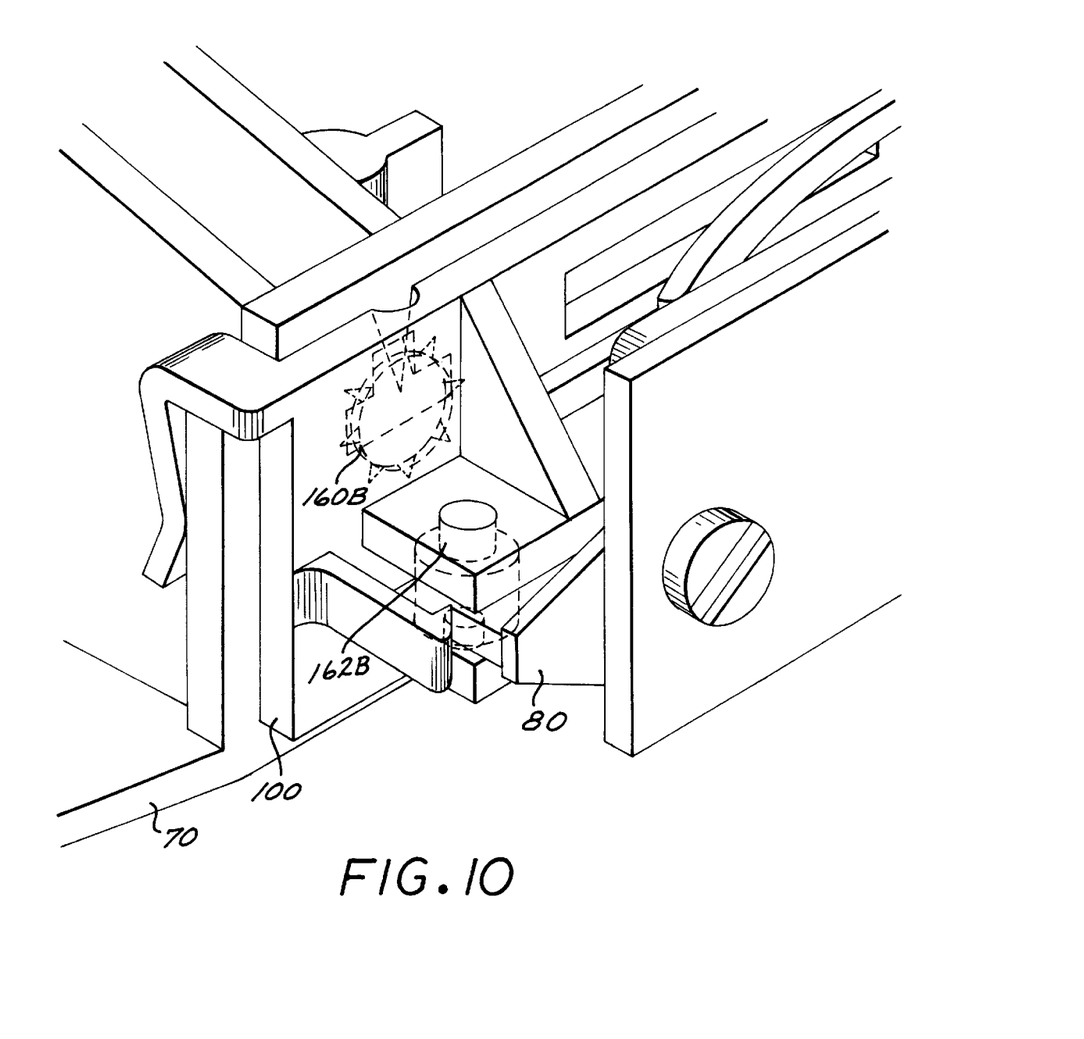
FIG. 10 is a close-up partial isometric view of a portion of the scanner assembly of FIG. 2 after application and curing of the adhesive.

FIGS. 8, 9 and 10 illustrate the cavities after the adhesive has been dispensed into the cavities 150B and 152B and cured into a hard material. Adhesive plug 160B fills the cavity 150B, and adheres to the cavity surfaces defined by the features 78B and 140B, and in combination with the adhesive plug 160A filling the cavity 150A, fixes the middle bracket 100 to the housing 70. Adhesive plug 162B fills the cavity 152B, and in combination with the adhesive plug 16A filling cavity 152A, fixes the CCD housing and middle bracket 100 rigidly together in a fixed position within the range of movement permitted by the compliance apparatus.

The adhesive dispensed into the cavities 150A, 150B and 152A, 152B is, in this exemplary embodiment, an adhesive which is a liquid when in an uncured state, and is cured by application of ultraviolet (UV) light to a solid state. Thus, the parts 70, 80 and 100 will be assembled loosely together by use of the clips 102A, 102B, and the locking lugs 118A, 118B to a rest position. The adhesive in its liquid, uncured state is dispensed into the cavities 150A, 150B, 152A, 152B. The CCD board 80 can then be moved within the range of movement permitted by the compliance apparatus, and the bracket 100 can be moved within the range of movement permitted by the clips 102A, 102B, until a desired position of the CCD board and the middle bracket is reached. Preferably this position is one at which the array 60 is aligned with the image light from the lens 58, but this invention permits the elements 70, 80 and 100 to be locked in any position within the range of movement, without the use of threaded fasteners. With the elements 70, 80 and 100 held in the desired position, e.g. in a fixture, the assembly is illuminated with UV light. Because the middle bracket 100 is fabricated of a material which is transparent to UV light, the adhesive in the cavities will be exposed to the UV light and cured to a solid state. The parts are then fixed at the desired position.

Adhesives suitable for this purpose are commercially available. One such adhesive is available from the Loctit Corporation, as adhesive 3321, part no. 19739. The adhesive can be cured to a solid state with an exposure time in the range of tens of seconds.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. Apparatus for securing an optical apparatus at a fixed relative location within a range of motion, comprising:
   a first housing member holding the optical apparatus;
   a first bracket member;
   compliant apparatus for holding the first housing member and the first bracket member loosely together, while permitting relative motion between the first housing and the first bracket member through a range of motion;
   a curable fixing element applied between areas of the first housing member and the first bracket member for securing the first housing member and the first bracket member together in a fixed position within the range of movement, the fixing element applied while in a liquid state to permit said relative motion, said fixing element curable to a solid state during a curing process, wherein the first housing member and said first bracket member are fixed in said relative position.

2. The apparatus of claim 1 wherein said curing process comprises the application of light at a predetermined spectral range to said fixing element.

3. The apparatus of claim 2 wherein said first bracket member includes structural portions which are transparent to said light of said predetermined spectral range.

4. The apparatus of claim 2 wherein said predetermined spectral range is the ultraviolet range.

5. The apparatus of claim 1, wherein the compliant apparatus comprises a first set of interlock elements on said middle bracket and a second set of interlock elements on said housing, wherein said first and second sets are interlocking to hold said bracket and housing loosely together.

6. The apparatus of claim 5 wherein said first set of interlocking elements includes a lug element having a barbed end, and said second set of interlocking elements includes a protruding ear portion, said barbed end of said lug element engagable over said protruding ear portion to provide said interlocking.

7. The apparatus of claim 1 wherein said complaint apparatus further includes a biasing structure for biasing the relative position of said first housing and said first bracket to a rest position within said range of motion.

8. The apparatus of claim 7 wherein said biasing structure comprises a plurality of resilient finger elements extending from said middle bracket and contacting a surface of said housing.

9. The apparatus of claim 1 wherein said first bracket member further comprises a first cavity defining feature, said housing member further comprises a second cavity defining feature, and wherein first and second cavity defining features cooperate together to define a first cavity for accepting said curable fixing element, and wherein said curable fixing element when cured forms an adhesive and mechanical interlock holding said first housing and said first bracket together.

10. The apparatus of claim 9 wherein said first cavity defining feature includes first and second spaced, aligned tab elements each having a hole defined therein, and wherein the holes are generally aligned colinearly, and said second cavity defining feature includes a third tab having a hole formed therein, and wherein said third tab is receivable between said first and second tabs such that said holes are generally aligned to form said cavity.

11. The apparatus of claim 10 wherein said hole formed in said third tab is of larger diameter than said holes formed in said first and second tab.

12. The apparatus of claim 1 wherein said optical apparatus includes an optical sensor.

13. Apparatus for securing an optical apparatus at a fixed relative location within a range of motion, comprising:
   a first housing member holding the optical apparatus;
   a middle bracket member;
   compliant apparatus for holding the first housing member and the first bracket member loosely together, while permitting relative motion between the first housing and the first bracket member through a first range of motion;
   a second housing member;
   apparatus for holding said middle bracket to said second housing member while permitting relative motion between the middle bracket and said second housing member through a second range of motion;
   a first curable fixing element applied between areas of the first housing member and the middle bracket member for securing the first housing member and the middle bracket member together in a fixed position within the range of movement, the fixing element applied while in a liquid state to permit said relative motion, said fixing element curable to a solid state by a curing process, wherein the first housing member and said middle bracket member are fixed in said relative position; and
   a second curable fixing element applied between areas of said middle bracket and said second housing member for securing the middle bracket and said second housing member together in a fixed position within the second range of motion, the second fixing element applied while in a liquid state to permit said relation motion within said second range of motion, said second fixing element curable to a solid state by said curing process, wherein the second housing member, said middle bracket and said first housing member are rigidly secured together in an optical assembly.

14. The apparatus of claim 13 wherein said curing process comprises the application of light at a predetermined spectral range to said fixing element.

15. The apparatus of claim 14 wherein said first bracket member includes structural portions which are transparent to said light of said predetermined spectral range.

16. The apparatus of claim 14 wherein said predetermined spectral range is the ultraviolet range.

17. The apparatus of claim 13, wherein said middle bracket member further comprises a first cavity defining feature, said second housing member further comprises a second cavity defining feature, and wherein first and second cavity defining features cooperate together to define a first cavity for accepting said second curable fixing element, and wherein said second curable fixing element when cured forms an adhesive interlock fixedly securing said first housing and said first bracket together.

18. The apparatus of claim 13 wherein said apparatus for holding said middle bracket to said second housing member includes a plurality of clip member protruding from and integrally formed with said middle bracket.

19. The apparatus of claim 13 wherein said middle bracket includes portions fabricated of a material transparent to said light of a predetermined spectral range.

20. An optical scanner for performing optical scanning functions, comprising:

a transparent scanning window;

an optical scanner housing, said housing securing said window and comprising optical light path defining elements to define an optical path between said window and a lens element, said lens element fixed in position relative to said scanner housing;

an optical sensor array positioned to intercept image light passing through said lens element;

apparatus for securing said optical sensor array at a fixed relative location within a range of motion relative to said scanner housing, comprising:

a sensor housing member holding the sensor array;

a middle bracket member;

compliant apparatus for holding the sensor housing member and the first bracket member loosely together, while permitting relative motion between the sensor housing and the middle bracket member through a first range of motion;

apparatus for holding said middle bracket to said scanner housing member while permitting relative motion between the middle bracket and said scanner housing member through a second range of motion;

a first curable fixing element applied between areas of the sensor housing member and the middle bracket member for securing the sensor housing member and the middle bracket member together in a fixed position within the range of movement, the first fixing element applied while in a liquid state to permit said relative motion, said first fixing element curable to a solid state by a curing process, wherein the sensor housing member and said middle bracket member are fixed in said relative position; and a second curable fixing element applied between areas of said middle bracket and said scanner housing member for securing the middle bracket and said scanner housing member together in a fixed position within the second range of motion, the second fixing element applied while in a liquid state to permit said relation motion within said second range of motion, said second fixing element curable to a solid state by a curing process, wherein the scanner housing member with said sensor array, said middle bracket and said scanner housing member are rigidly secured together in an optical assembly.

21. The optical scanner of claim 20 wherein said curing process comprises the application of light at a predetermined spectral range to said first and second fixing elements.

22. The optical scanner of claim 21 wherein said first bracket member includes structural portions which are transparent to said light of said predetermined spectral range.

23. The apparatus of claim 21 wherein said predetermined spectral range is the ultraviolet range.

* * * * *